United States Patent
Nariyuki

(10) Patent No.: US 7,868,309 B2
(45) Date of Patent: Jan. 11, 2011

(54) RADIATION DETECTING SYSTEM

(75) Inventor: Fumito Nariyuki, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/048,424

(22) Filed: Mar. 14, 2008

(65) Prior Publication Data

US 2008/0224055 A1    Sep. 18, 2008

(30) Foreign Application Priority Data

Mar. 15, 2007    (JP) ............................. 2007-066407

(51) Int. Cl.
*G01N 23/04* (2006.01)
*G01T 1/24* (2006.01)

(52) U.S. Cl. ........................ 250/580; 250/582; 313/504; 403/76

(58) Field of Classification Search ................. 250/580, 250/582; 313/504; 430/76
See application file for complete search history.

(56) References Cited

U.S. PATENT DOCUMENTS

| 5,876,786 | A | * | 3/1999 | Zyung et al. | .................. 427/64 |
| 7,002,173 | B2 | | 2/2006 | Imai | |
| 2003/0010943 | A1 | * | 1/2003 | Imai | ............................ 250/580 |
| 2003/0132703 | A1 | * | 7/2003 | Sakaguchi | .................. 313/504 |
| 2004/0164230 | A1 | * | 8/2004 | Izumi et al. | .............. 250/214.1 |
| 2006/0192131 | A1 | * | 8/2006 | Cheung et al. | .......... 250/370.14 |

FOREIGN PATENT DOCUMENTS

JP    2006093279 A  *  4/2006
JP    2006156555 A     6/2006

* cited by examiner

*Primary Examiner*—David P Porta
*Assistant Examiner*—Jessica L Eley
(74) *Attorney, Agent, or Firm*—Sughrue Mion, PLLC

(57) ABSTRACT

In a radiation detecting system including a first electrode which is imparted with a positive bias and permeable to a recording electromagnetic wave carrying thereon image information, a recording photoconductive layer which generates electric charges in response to receipt of projection of the recording electromagnetic wave, an organic polymer layer provided between the first electrode and the recording photoconductive layer, and a second electrode which is provided on the side of the recording photoconductive layer opposite to a side where the first electrode is provided and being for recording the image information by storing electric charges generated in the recording photoconductive layer upon projection of the recording electromagnetic wave, the organic polymer layer includes a hole blocking material.

6 Claims, 1 Drawing Sheet

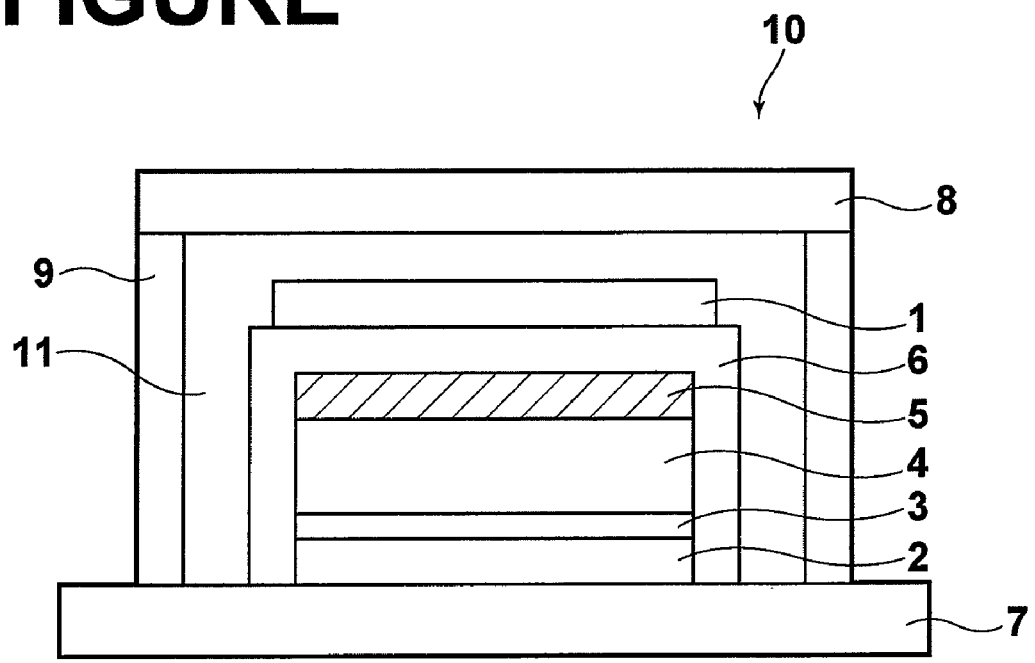
FIGURE

RADIATION DETECTING SYSTEM

BACKGROUND OF THE INVENTION

1. Field of the Invention

This invention relates to a radiation detecting system suitable for applying to a radiation image taking system such as an X-ray system.

2. Description of the Related Art

There has been known a radiation image taking system in which a radiation detecting system (including a semiconductor as a main part) which detects radiation and converts it to an electric signal in the medical field radiation image taking for diagnosis. As the radiation detecting system, there have been known a direct conversion system where radiation is directly converted to an electric charge, and the electric charge is stored, and an indirect conversion system where radiation is once converted to light by a scintillator such as of CsI:Tl or GOS($Gd_2O_2S$:Tb), and the light is converted to an electric charge by a photoconductive layer and the electric charge is stored. Further, from the read-out system, the radiation detecting system can be broadly divided into a so-called optical read-out system where, the radiation is read out by the radiation detector by the use of semiconductor material which generates electric charges upon exposure to light and to a system (will be referred to as "the TFT system", hereinbelow), where the electric charges generated in response to projection of radiation are stored and the stored electric charges are read out by turning on and off an electrical switch such as a TFT transistor (thin film transistor) by one pixel by one pixel.

In the radiation detecting system of the direct conversion system, radiation is detected by applying a predetermined bias voltage to a voltage applying electrode formed on the surface of a radiation-sensitive semiconductor layer (recording photoconductive layer), and collecting the carriers generated in response to projection of radiation with a carrier collective electrode formed on the back surface of the semiconductor layer to take out as the radiation detecting signal, and the recording photoconductive layer is often formed of an amorphous-Se (a-Se) because of advantage that it exhibits a high dark resistance, and is excellent in response.

However, when the recording photoconductive layer is formed and then a first electrode layer is formed on the surface thereof, the Se layer in the amorphous state gives rise to a problem that crystallization is promoted in an interface thereof due to heat during deposition in formation of the first electrode layer or contact with the electrode material. Since the crystallization in an interface increases the current injection from the first electrode upon recording the radiation image information, this makes noise and deteriorates the S/N. When a transparent oxide layer is used as the electrode material, especially when an ITO or IZO is used as the electrode material, the crystallization is remarkably promoted in an interface between the electrode material and the a-Se.

There has been provided a suppressing layer for suppressing an interface crystallization of a recording photoconductive layer of an organic polymer between a first electrode from which the recording light is irradiated, and the recording photoconductive layer to which the recording light is irradiated in order to avoid a problem an interface crystallization of a recording photoconductive layer. However, when a suppressing layer of an organic polymer is used, for instance, in the case where that a radiation image is recorded by a large amount of radiation and that the image is read out are repeatedly conducted, the electric charges remain in the suppressing layer, which gives rise to a problem of deterioration in sensitivity or remaining of a ghost image. Accordingly, it has been proposed to form the suppressing layer which is formed between the first electrode and the recording photoconductive layer to suppress the interface crystallization of a recording photoconductive layer by an organic film (insulating organic polymer) which exhibits insulation to electric charges opposite in polarity to the electric charges moving to the first electrode upon recording image information and exhibits conductivity to electric charges the same in polarity as the electric charges moving to the first electrode upon recording image information. (U.S. Pat. No. 7,002,173).

On the other hand, there is disclosed in Japanese Unexamined Patent Publication No. 2006-156555 that in a two-dimensional X-ray detecting system having an X-ray converting film, a first electrode formed on one side of the X-ray converting film, a second electrode formed on the other side of the X-ray converting film, and an organic film intervening between the X-ray converting film and the second electrode, the organic film may be selected from acrylic series organic resin, polyimide, PCB, PVA, acryl, polyethylene, polycarbonate, polyetherimide or conductive polymer, and it contains pigment or conductive metal or conductive carbon.

However, the insulating organic polymer involves a problem that the expected function of electron transfer cannot be sufficiently obtained. This is because it also works as an electron block layer while it is excellent in blocking the holes.

SUMMARY OF THE INVENTION

In view of the foregoing observations and description, the primary object of the present invention is to provide a radiation detecting system which is excellent in the electric characteristics such as the dark current and afterimage.

Though there is a description on the conductive carbon in Japanese Unexamined Patent Publication No. 2006-156555, since the "conductive carbon" normally means carbon black or carbon in the form of graphite and is described in parallel to the conductive metal, it is simply used for adjusting conductivity (electric resistance) and for purpose and effect different from those of the present invention.

In accordance with the present invention, there is provided a radiation detecting system equipped with a first electrode which is imparted with a positive bias and permeable to a recording electromagnetic wave carrying thereon image information, a recording photoconductive layer which generates electric charges in response to receipt of projection of the recording electromagnetic wave, an organic polymer layer provided between the first electrode and the recording photoconductive layer, and a second electrode which is provided on the side opposite to a side where the first electrode is provided with respect to the recording photoconductive layer, and is for recording the image information by storing electric charges generated in the recording photoconductive layer upon projection of the recording electromagnetic wave, wherein:

the organic polymer layer includes a hole blocking material.

The hole blocking material is a material which blocks the hole while transmits an electron and it is preferred that at least one kind of the hole blocking material be carbon cluster or its derivative where the carbon cluster is preferably at least one kind selected from a group consisting of fullerene $C_{60}$, fullerene $C_{70}$, fullerene oxide, and their derivatives.

Otherwise, at least one kind of the hole blocking material included in the organic polymer layer may be a compound represented by the following general formula (A-1) or (B-1).

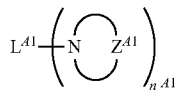

General Formula (A-1)

wherein $L^{A1}$ represents a linkage group, $Z^{A1}$ represents an element group necessary for forming a nitrogen-containing heterocycle and $n^{A1}$ represents an integer not smaller than 2. The compound represented by the general formula (A-1) contains at least 3 nitrogen atoms in an element thereof.

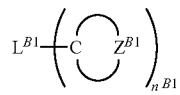

General formula (B-1)

wherein $L^{B1}$ represents a linkage group, $Z^{B1}$ represents an element group necessary for forming an aromatic hydrocarbon or an aromatic heterocycle and $n^{B1}$ represents an integer not smaller than 2. The compound represented by the general formula (B-1) contains at least 3 nitrogen atoms in an element thereof.

Since in the radiation detecting system of the present invention, in radiation detecting systems equipped with a first electrode which is imparted with a positive bias and permeable to a recording electromagnetic wave carrying thereon image information, a recording photoconductive layer which generates electric charges in response to receipt of projection of the recording electromagnetic wave, an organic polymer layer provided between the first electrode and the recording photoconductive layer, and a second electrode which is provided on the side opposite to a side where the first electrode is provided with respect to the recording photoconductive layer, and is for recording the image information by storing electric charges generated in the recording photoconductive layer upon projection of the recording electromagnetic wave, the organic polymer layer includes a hole blocking material, the dark current is low and the afterimage can be suppressed.

BRIEF DESCRIPTION OF THE DRAWINGS

FIGURE is a schematic cross-sectional view showing a radiation detecting system in accordance with an embodiment of the present invention.

DESCRIPTION OF THE PREFERRED EMBODIMENT

Radiation detecting systems in accordance with embodiments of the present invention will be described in detail, hereinbelow. FIGURE is a schematic cross-sectional view showing a radiation detecting system in accordance with an embodiment of the present invention.

As shown in FIGURE, a radiation detecting system 10 of the present invention has a second electrode 7 equipped with a read-out circuit formed by switching TFT's and a pixel electrode. On the second electrode 7 are superposed one on another in this order charge transfer layer 2 which substantially behaves as an insulating body to charges which are generated in a recording photoconductive layer 4 and flow toward the second electrode 7 and substantially behaves as a conductive body to transferred charges opposite in polarity to the charges, a crystallization suppressing layer 3, the recording photoconductive layer 4 which generates electric charges when exposed to electromagnetic waves, an organic polymer layer 5 including a hole blocking material, a charge transfer layer 6 which transfers the charges which are generated in the recording photoconductive layer 4 and flow toward a first electrode 1 which is applied with a positive bias and transmits the recording electromagnetic waves carrying thereon image information, and the space between the glass plate 8 formed on the first electrode 1 and a resin frame 9 surrounding all the directions is filled with a resin 11.

In the second electrode 7, a TFT is formed for each pixel, and when a voltage is applied to between the first and second electrodes 1 and 7, a positive bias is applied to the first electrode 1. The output lines of the respective TFT's are connected to the signal detecting means (not shown).

The first electrode 1 may be formed by any material so long as it exhibits transparency to the radiation, and, for instance, Al or Au 100 nm thick may be used. Otherwise, the first electrode 1 maybe a nesa film ($SnO_2$), ITO (IndiumTin Oxide) or IDIXO (Idemitsu indiumX-metal Oxide: available from Idemitsu Kosan Co., Ltd.) which is an amorhous light transmitting oxide film, in a thickness of 50 to 200 nm.

The recording photoconductive layer 4 may be any so long as it exhibits a photoconductivity in response to exposure to radiation and those containing therein a-Se as a main component may be employed in that it is relatively high in quantum efficiency and high in dark resistance. The "main component" means in this specification a component of the recording photoconductive layer 4 whose weight percentage is the highest in the components of the recording photoconductive layer 4.

Charge transfer layers 2 and 6 respectively transfer the electric charges which flow from the recording photoconductive layer 4 toward the second electrode 7 and toward the first electrode 1, and it is preferred that the charge transfer layer 2 substantially behaves as an insulating body to the transferred charges opposite to the charges in polarity. The charge transfer layers 2 and 6 may be film of chalcogenide compounds. Specifically, antimony sulfide, zinc sulfide, $As_2S_3$, CdS, CdZnTe and the like are suitable. For a-Se, from the viewpoint of transferability, $As_2S_3$ and antimony sulfide are preferable, and antimony sulfide is more preferable. The charge transfer layers 2 and 6 may be 0.1 µm to 10 µm in thickness. Though, formed between the organic polymer layer 5 and the first electrode 1 in FIGURE, the charge transfer layer 6 is not essential. When the charge transfer layer 6 is formed, it is preferred that the charge transfer layer 6 is wider than at least the organic polymer layer 5 and the recording photoconductive layer 4 in film forming area. This is because, for instance, there is a probability that, when a cured type resin is injected into the area 11, the organic polymer layer is dissolved and attacked by uncured resin.

The crystallization suppressing layer 3 is a layer for suppressing crystallization of the interface between the charge transfer layer 2 and the recording photoconductive layer 4 and a-Se containing therein at least one of As, Sb, Bi in 0.1 wt % to 40 wt % may be used as the crystallization suppressing layer 3. It is preferred that the crystallization suppressing layer 3 be 0.02 to 1 µm in thickness.

Further, when a recording photoconductive layer containing therein a-Se as a main component is employed, it is preferred that the recording photoconductive layer 4 and the organic polymer layer 5 be adjacent to each other. When the organic polymer layer 5 is adjacent to the recording photoconductive layer 4, crystallization of the recording photoconductive layer 4 can be suppressed.

The organic polymer layer 5 includes a hole blocking material and as the hole blocking material, the followings can be shown.

First, the carbon cluster or its derivatives can be shown. The term "the carbon cluster or its derivatives" as used here generally means a compound where several to several hundreds of carbon atoms are bonded together irrespective of the kind of carbon to carbon bonding, and it is not necessary to be formed only by carbon cluster up to 100% and other atoms or substituent may be included. The carbon cluster used as the hole blocking material is a material including one or more fullerenes.

The term "the fullerene" as used here generally means a spherical or a Rugby-ball-like carbon clusters formed by sp2 carbon atoms, and $C_{60}$, $C_{70}$, $C_{76}$, $C_{78}$, $C_{84}$ and the like are generally known. In the present invention, these may be used alone or in a mixture. A mixture of $C_{60}$ and $C_{70}$ is especially suitable. Further, the fullerene oxides where the fullerene is oxidized can be suitably used. As the fullerene oxide, a mixture of $C_{60}(O)1$, $C_{60}(O)2$, $C_{60}(O)3$ or the like may be used. Suitably a compound such as those shown by the following general formula, where Oxygen-substitution groups are added according to region selection rule, is preferable though those where functional groups are added may be used.

As the linkage group represented by $L^{A1}$, those including carbon atoms, silicon atoms, phosphorus atoms, nitrogen atoms, sulfur atoms, oxygen atoms, boron atoms, germanium atoms be preferable as well as a single bond. As the linkage group represented by $L^{A1}$, a single bond, carbon atoms, silicon atoms, phosphorus atoms, nitrogen atoms, sulfur atoms, oxygen atoms, boron atoms, germanium atoms, aromatic hydrocarbon rings, and aromatic heterocycles are more preferred, and carbon atoms, silicon atoms, aromatic hydrocarbon rings, and aromatic heterocycles are further preferred, and not less than two valences of aromatic hydrocarbon rings and aromatic heterocycles and carbon atoms are further preferred, and not less than two valents of aromatic hydrocarbon rings and aromatic heterocycles are further preferred, and 1,3,5-benzotriyl groups, 1,2,5,6-benzotetrayl groups, 1,2,3,4,5,6-benzohexayl groups, 2,2'-dimethyl-4,4'-biphenylene groups, 2,4,6-pyridinetriyl groups, 2,3,4,5,6-pyridinepentayl groups, 2,4,6-pyrimidinetriyl groups, 2,4,6-triazinetriyl groups, and 2,3,4,5-thiophenetetrayl groups are especially preferred.

As specific examples of the linkage group represented by $L^{A1}$, the following can be shown but are not limited to the following.

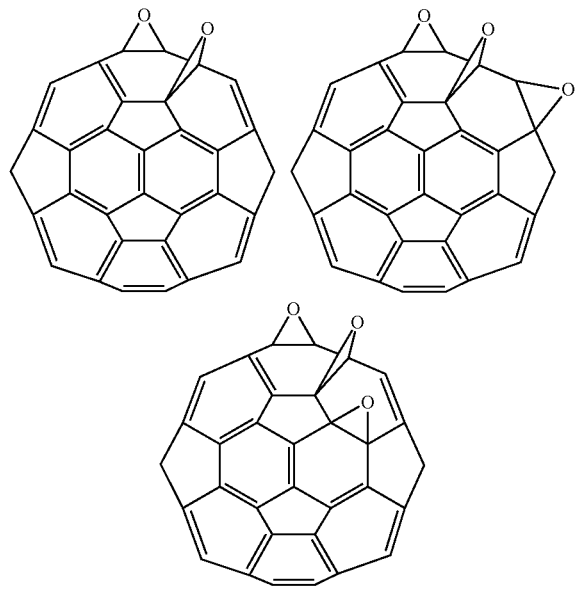

As the hole blocking material, those represented by the following general formula (A-1) or (B-1) can be suitably used. Compounds represented by the general formula (A-1) will be first described.

General Formula (A-1)

wherein $L^{A1}$ represents a linkage group, $Z^{A1}$ represents an element group necessary for forming a nitrogen-containing heterocycle and $n^{A1}$ represents an integer not smaller than 2. The compound represented by the general formula (A-1) contains at least 3 nitrogen atoms in an element thereof.

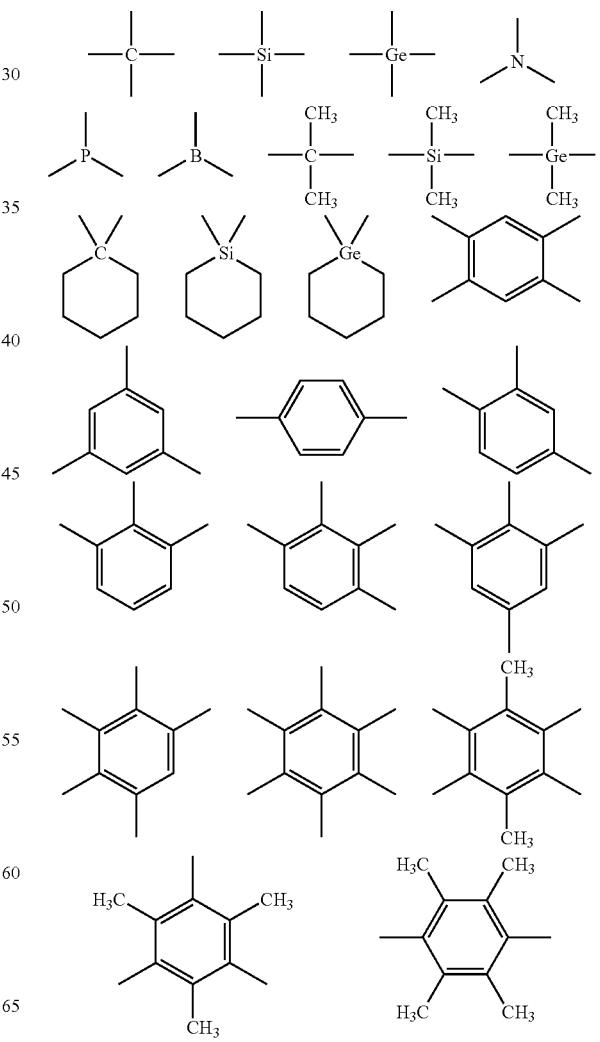

-continued
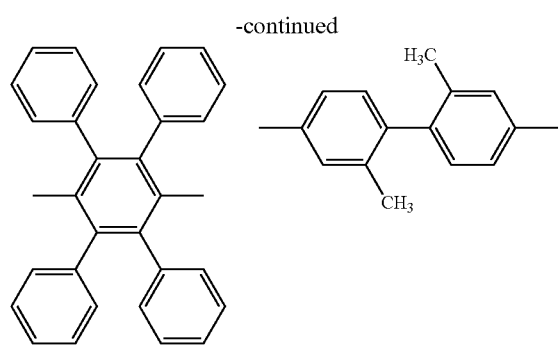
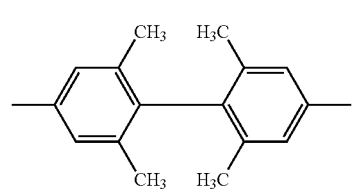
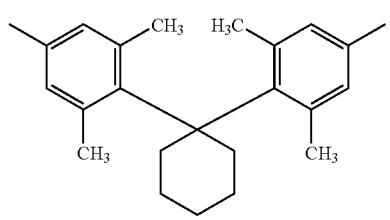
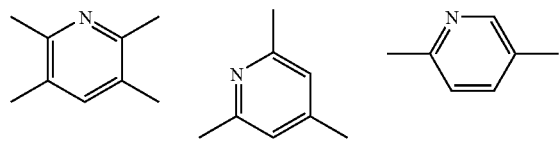
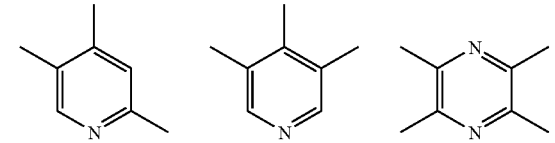
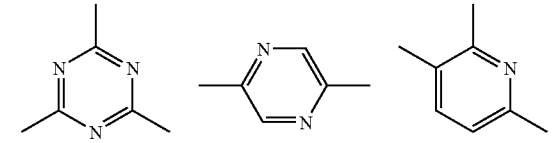
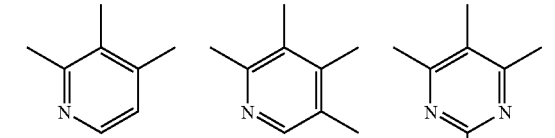
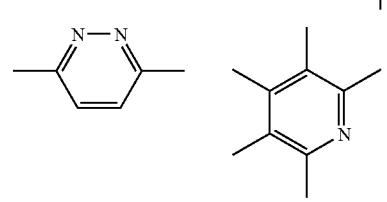
-continued
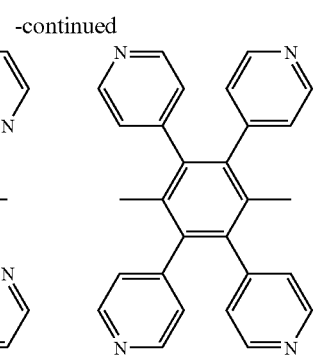
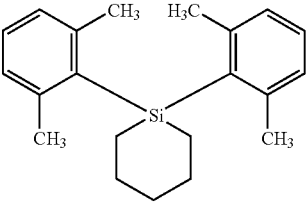
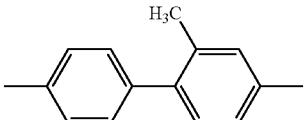
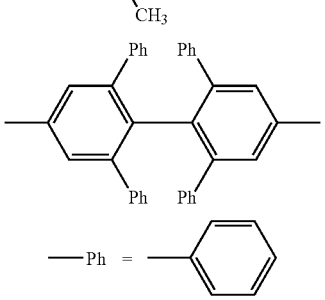
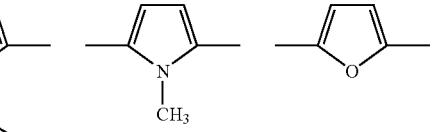
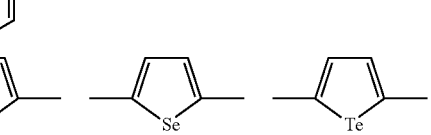
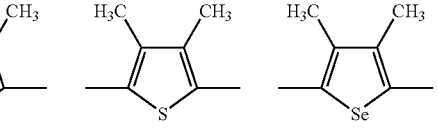
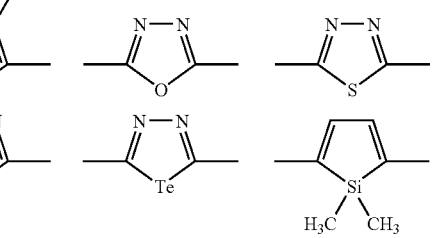

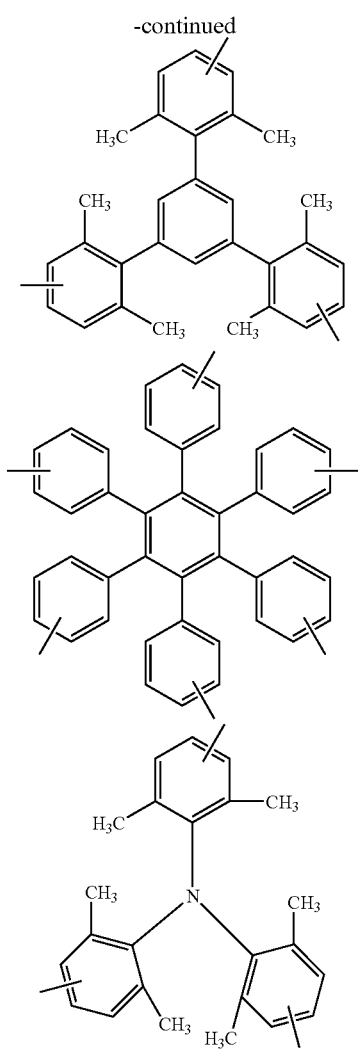

The L$^{41}$ may further have a substituent group and the substituent group which can be introduced includes, for instance, an alkyl group (preferably 1 to 30 in number of the carbon atoms, more preferably 1 to 20 in number of the carbon atoms, and most preferably 1 to 10 in number of the carbon atoms and, for instance, methyl, ethyl, iso-propyl, tert-butyl, n-octyl, n-decyl, n-hexadecyl, cyclopropyl, cyclopentyl, cyclohexyl, and the like can be shown), an alkenyl group (preferably 2 to 30 in number of the carbon atoms, more preferably 2 to 20 in number of the carbon atoms, and most preferably 2 to 10 in number of the carbon atoms and, for instance, vinyl, allyl, 2-butenyl, 3-pentenyl and the like can be shown), an alkynyl group (preferably 2 to 30 in number of the carbon atoms, more preferably 2 to 20 in number of the carbon atoms, and most preferably 2 to 10 in number of the carbon atoms and, for instance, propargyl, 3-pentinyl and the like can be shown), an aryl group (preferably 6 to 30 in number of the carbon atoms, more preferably 6 to 20 in number of the carbon atoms, and most preferably 6 to 12 in number of the carbon atoms and, for instance, phenyl, p-methylphenyl, naphthyl, anthranil and the like can be shown), an amino group (preferably 0 to 30 in number of the carbon atoms, more preferably 0 to 20 in number of the carbon atoms, and most preferably 0 to 10 in number of the carbon atoms and, for instance, amino, methyl amino, dimethyl amino, diethyl amino, dibenzyl amino, diphenyl amino, ditolyl amino, and the like can be shown), an alkoxy group (preferably 1 to 30 in number of the carbon atoms, more preferably 1 to 20 in number of the carbon atoms, and most preferably 1 to 10 in number of the carbon atoms and, for instance, methoxy, ethoxy, buthoxy, 2-ethylhexyroxy and the like can be shown), an aryloxy group (preferably 6 to 30 in number of the carbon atoms, more preferably 6 to 20 in number of the carbon atoms, and most preferably 6 to 12 in number of the carbon atoms and, for instance, phenyloxy, 1-naphthyloxy, 2-naphthyloxy, and the like can be shown), a heterocycleoxy group (preferably 1 to 30 in number of the carbon atoms, more preferably 1 to 20 in number of the carbon atoms, and most preferably 1 to 12 in number of the carbon atoms and, for instance, pyridiloxy, pyraziloxy, pyrimidiloxy, quinoliloxy, and the like can be shown), an acyl group (preferably 1 to 30 in number of the carbon atoms, more preferably 1 to 20 in number of the carbon atoms, and most preferably 1 to 12 in number of the carbon atoms and, for instance, acetyl, benzoyl, formyl, pivaloyl, and the like can be shown), an alkoxycarbonyl group (preferably 2 to 30 in number of the carbon atoms, more preferably 2 to 20 in number of the carbon atoms, and most preferably 2 to 12 in number of the carbon atoms and, for instance, methoxycarbonyl, ethoxycarbonyl and the like can be shown), an aryloxycarbonyl group (preferably 7 to 30 in number of the carbon atoms, more preferably 7 to 20 in number of the carbon atoms, and most preferably 7 to 12 in number of the carbon atoms and, for instance, phenyloxycarbonyl and the like can be shown), an acyloxy group (preferably 2 to 30 in number of the carbon atoms, more preferably 2 to 20 in number of the carbon atoms, and most preferably 2 to 10 in number of the carbon atoms and, for instance, acetoxy, benzoyloxy and the like can be shown), an acylamino group (preferably 2 to 30 in number of the carbon atoms, more preferably 2 to 20 in number of the carbon atoms, and most preferably 2 to 10 in number of the carbon atoms and, for instance, acetylamino, benzoyl amino and the like can be shown), an alkoxycarbonylamino group (preferably 2 to 30 in number of the carbon atoms, more preferably 2 to 20 in number of the carbon atoms, and most preferably 2 to 12 in number of the carbon atoms and, for instance, methoxycarbonylamino and the like can be shown), an aryloxycarbonylamino group (preferably 7 to 30 in number of the carbon atoms, more preferably 7 to 20 in number of the carbon atoms, and most preferably 7 to 12 in number of the carbon atoms and, for instance, phenyloxycarbonylamino and the like can be shown), a sulfonylamino group (preferably 1 to 30 in number of the carbon atoms, more preferably 1 to 20 in number of the carbon atoms, and most preferably 1 to 12 in number of the carbon atoms and, for instance, methanesulfonylamino, benzenesulfonylamino and the like can be shown), a sulfamoyl group (preferably 0 to 30 in number of the carbon atoms, more preferably 0 to 20 in number of the carbon atoms, and most preferably 0 to 12 in number of the carbon atoms and, for instance, sulfamoyl, methylmethylsulfamoyl, dimethylsulfamoyl, pyhenylsulfamoyl and the like can be shown), a carbamoyl group (preferably 1 to 30 in number of the carbon atoms, more preferably 1 to 20 in number of the carbon atoms, and most preferably 1 to 12 in number of the carbon atoms and, for instance, carbamoyl, methylcarbamoyl, diethylcarbamoyl, pyhenylcarbamoyl and the like can be shown), an alkylthio group (preferably 1 to 30 in number of the carbon atoms, more preferably 1 to 20 in number of the carbon atoms, and most preferably 1 to 12 in number of the carbon atoms and, for instance, methylthio, ethylthio and the like can be shown), an arylthio group (preferably 6 to 30 in number of the carbon atoms, more preferably 6 to 20 in number of the carbon atoms, and most preferably 6 to 12 in number of the carbon atoms and, for instance, phenylthio and the like can be shown, a heterocyclethio group (preferably 1 to 30 in number of the carbon atoms, more preferably 1 to 20 in number of the carbon atoms, and most preferably 1 to 12 in number of the carbon atoms and, for instance, pyridilthio, 2-benzimidazolyltyhio, 2-benzoxazolylthio , 2-benzthiazolylthio, and the like can be shown), a sulfonyl group (preferably 1 to 30 in number of the carbon atoms, more preferably 1 to 20 in number of the carbon atoms, and most preferably 1 to 12 in number of the carbon atoms and, for instance, mesyl, tosyl and the like can be shown), a sulfenyl group (preferably 1 to 30 in number of the carbon atoms, more preferably 1 to 20 in number of the carbon atoms, and most preferably 1 to 12 in number of the carbon atoms and, for instance, methanesulfinyl, benzenesulfinyl and the like can be shown), an ureido group (preferably 1 to 30 in number of the carbon atoms, more preferably 1 to 20 in number of the carbon atoms, and most preferably 1 to 12 in number of the carbon atoms and, for instance, ureido, methylureido, phenylureido and the like can be shown), an amide phosphate group (preferably 1 to 30 in number of the carbon atoms, more preferably 1 to 20 in number of the carbon atoms, and most preferably 1 to 12 in number of the carbon atoms and, for instance, diethylamide phosphate, phenyamide phosphate and the like can be shown), a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocycle group (preferably 1 to 30 in number of the carbon atoms, more preferably 1 to 12 in number of the carbon atoms and as a hetero atom, for instance, including a nitrogen atom, an oxygen atom or a sulfur atom. Specifically, imidazolyl, pyridil, quinolyl, furil, thienyl, piperidyl, morpholino, benzoxazolyl, benzimidazolyl, benzthiazolyl, a carbazolyl group, a azepinyl group and the like can be shown), a silyl group (preferably 3 to 40 in number of the carbon atoms, more preferably 3 to 30 in number of the carbon atoms, and most preferably 3 to 24 in number of the carbon atoms and, for instance, trimethylsilyl, triphenylsilyl and the like can be shown), a silyloxy group (preferably 3 to 40 in number of the carbon atoms, more preferably 3 to 30 in number of the carbon atoms, and most preferably 3 to 24 in number of the carbon atoms and, for instance, trimethylsilyloxy, triphenylsilyloxy and the like can be shown). These substituent group may be substituted by further substituent group, and as the further substituent group, an alkyl group, an aryl group, a heterocycle group, a halogen atom and disilyl group are preferred, an alkyl group, an aryl group, a heterocycle group and a halogen atom are more preferred, and an alkyl group, an aryl group, a aromatic heterocycle group and a fluorine atom are most preferred.

As the $L^{41}$, those in the following 2,4,6-triazinetriyl group are especially preferred to those in the above-described groups.

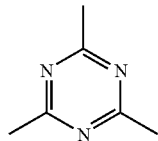

The $Z^{41}$ in the general formula (A-1) represents an atom group necessary for formation of a nitrogen-containing hetero cycle, and the nitrogen-containing hetero cycle including the $Z^{41}$ may be a single ring or a fused ring where not smaller than 2 rings are condensed. The nitrogen-containing hetero cycle including the $Z^{41}$ is preferably a nitrogen-containing hetero cycle 5 to 8 in number of the nitrogen atoms, more preferably a nitrogen-containing hetero cycle 5 to 7 in number of the nitrogen atoms, and most preferably a nitrogen-containing aromatic hetero cycle 5 or 6 in number of the nitrogen atom. An aromatic hetero cycle 5 in number of the nitrogen atom is especially preferred. A plurality of nitrogen-containing hetero cycles including the $Z^{41}$ connected to the $L^{41}$ may either be the same or different from each other.

As the specific example of the nitrogen-containing hetero cycle including the $Z^{41}$, for example, a pyrrole ring, an indole ring, an oxazole ring, an oxadiazole ring, a thiazole ring, a thiadiazole ring, an azaindole ring, a carbazole ring, a carboline ring (norharman ring), an imidazole ring, a benzoimidazole ring, an imidazopyridine ring, a purine ring, a pyrazole ring, an indazole ring, an azaindazole ring, a triazole ring, a tetrazole ring, an azepine ring, an iminostilbene ring (dibenzoazepine ring), tribenzoazepine ring, a phenothiazine ring, a phenoxazine ring can be shown, and an oxadiazole ring, a triazole ring, an imidazole ring, a benzoimidazole ring and an imidazopyridine ring are preferred, and a benzoimidazole ring and an imidazopyridine ring are more preferred.

The $Z^{41}$ may form a condensed ring with other rings if possible and may be provided with a substituent group. The substituent group may be the same as those listed above as the substituent group for the general formula (A-1), and the preferred range are the same.

$n^{41}$ represents an integer not smaller than 2 which is preferably 2 to 8 and more preferably 2 to 6.

Specific compounds represented by general formula (A-1) include, for instance, the following compounds.

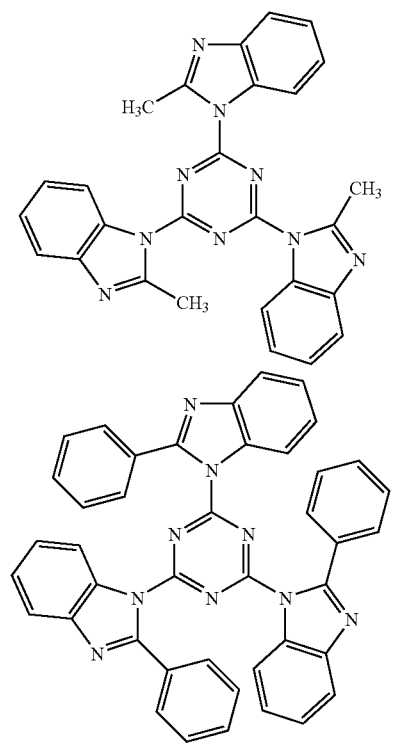

Compounds represented by the general formula (B-1) will be described next.

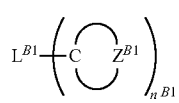
General Formula (B-1)

wherein $L^{B1}$ represents a linkage group, $Z^{B1}$ represents an element group necessary for forming an aromatic hydrocarbon or an aromatic heterocycle and nB1 represents an integer not smaller than 2. The compound represented by the general formula (B-1) contains at least 3 nitrogen atoms in an element thereof.

In the general formula (B-1), the $L^{B1}$ represents a linkage group. As the linkage group represented by $L^{B1}$, those shown as the specific examples of the linkage group $L^{A1}$ in the general formula (A-1) may be used. As the linkage group represented by $L^{B1}$, a single bond, not less than two valences of aromatic hydrocarbon rings, aromatic heterocycles, carbon atoms, nitrogen atoms, and silicon atoms are preferred, and not less than two valences of aromatic hydrocarbon rings and aromatic heterocycles are more preferred, and 1,3,5-benzotriyl groups, 1,2,5,6-benzotetrayl groups, 1,2,3,4,5,6-benzohexayl groups, 2,2'-dimethyl-4,4'-biphenylene groups, 2,4,6-pyridinetriyl groups, 2,3,4,5,6-pyridinepentayl groups, 2,4,6-pyrimidinetriyl groups, 2,4,6-triazinetriyl groups, 2,3,4,5-thiophenetetrayl groups, carbon atoms, nitrogen atoms, and silicon atoms are especially preferred.

The $L^{B1}$ may further have a substituent group and the substituent group which can be introduced includes, for instance, the substituent groups which may be the same as those listed above as the substituent groups for the general formula (A-1), and the preferred range are the same.

As the $L^{B1}$, 1,3,5-benzotriyl groups are especially preferred.

The $Z^{B1}$ represents an atom group necessary for formation of an aromatic hydrocarbon rings, and an aromatic hetero cycle, and the aromatic hydrocarbon rings and the aromatic hetero cycles including the $Z^{B1}$ maybe a single ring or a fused ring where not smaller than 2 rings are condensed. A plurality of the aromatic hydrocarbon rings and an aromatic hetero cycles including the $Z^{B1}$ connected to the $L^{B1}$ may either be the same or different from each other.

The aromatic hydrocarbon rings including the $Z^{B1}$ are preferably an aromatic hydrocarbon ring 6 to 30 in number of the carbon atoms, more preferably an aromatic hydrocarbon ring 6 to 20 in number of the carbon atoms, and most preferably an aromatic hydrocarbon ring 6 to 12 in number of the carbon atoms. For example, the aromatic hydrocarbon rings including the $Z^{B1}$ include benzene ring, naphthalene ring, anthracene ring, phenanthrene ring, pyrene ring, triphenylene ring, and the like are shown and benzene ring, naphthalene ring, phenanthrene ring, triphenylene ring, are preferred.

The aromatic hetero cycles including the $Z^{B1}$ are a single ring or a fused ring where not smaller than 2 rings are condensed. The aromatic hetero cycles including the $Z^{B1}$ are preferably those 1 to 20 in number of the carbon atoms, more preferably those 2 to 12 in number of the carbon atoms, and most preferably those 2 to 10 in number of the carbon atoms. As the hetero cycles, those having one of nitrogen atoms, oxygen atoms and sulfur atoms are preferred and as the hetero cycles included in the $Z^{B1}$, pyridine cycle, quinoline cycle, isoquinoline cycle, acridine cycle, phenantridine cycle, pyrazinoic cycle, quinoxaline cycle, pyrimidine cycle, quinazoline cycle, pyridazine cycle, cinnoline cycle, phthalazine cycle, triazine cycle, oxazole cycle, benzoxazole cycle, thiazole cycle, benzothiazole cycle, imidazole cycle, benzoimidazole cycle, pyrazole cycle, indazole cycle, isooxazole cycle, benzoisooxazole cycle, isothiazole cycle, benzoisothiazole cycle, oxsadiazole cycle, thiadiazole cycle, triazole cycle, tetrazole cycle, furan cycle, benzofuran cycle, thiophene cycle, benzothiophene cycle, pyrrole cycle, indole cycle, imidazopyridine cycle, carbazole cycle, phenanthroline cycle, and the like are shown, while the pyridine cycle, quinoline cycle, isoquinoline cycle, acridine cycle, phenantridine cycle, pyrazinoic cycle, quinoxaline cycle, pyrimidine cycle, quinazoline cycle, pyridazine cycle, phthalazine cycle, triazine cycle, imidazole cycle, benzoimidazole cycle, pyrazole cycle, indazole cycle, oxsadiazole cycle, triazole cycle, imidazopyridine cycle, carbazole cycle, phenanthroline cycle are preferred, the pyridine cycle, quinoline cycle, isoquinoline cycle, pyrazinoic cycle, quinoxaline cycle, pyrimidine cycle, quinazoline cycle, pyridazine cycle, phthalazine cycle, triazine cycle, imidazole cycle, benzoimidazole cycle, oxsadiazole cycle, triazole cycle, imidazopyridine cycle, phenanthroline cycle are more preferred, and benzoimidazole cycle and imidazopyridine cycle are most preferred.

The aromatic hydrocarbon rings or the aromatic hetero cycles including the $Z^{B1}$ may be further condensed with other rings to form a condensed ring or may have a substituent group. The substituent group which can be introduced includes, for instance, the substituent groups which may be the same as those listed above as the substituent groups for $L^{A1}$ in the general formula (A-1), and the preferred range are the same.

$n^{B1}$ represents an integer not smaller than 2 while preferably an integer 2 to 8, and most preferably an integer 2 to 6.

As the specific examples of the compounds represented by the general formula (B-1), for instance, the following compounds are shown.

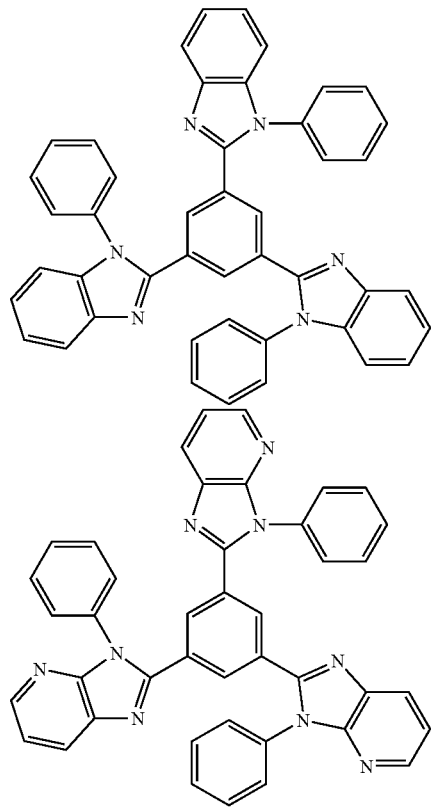

-continued

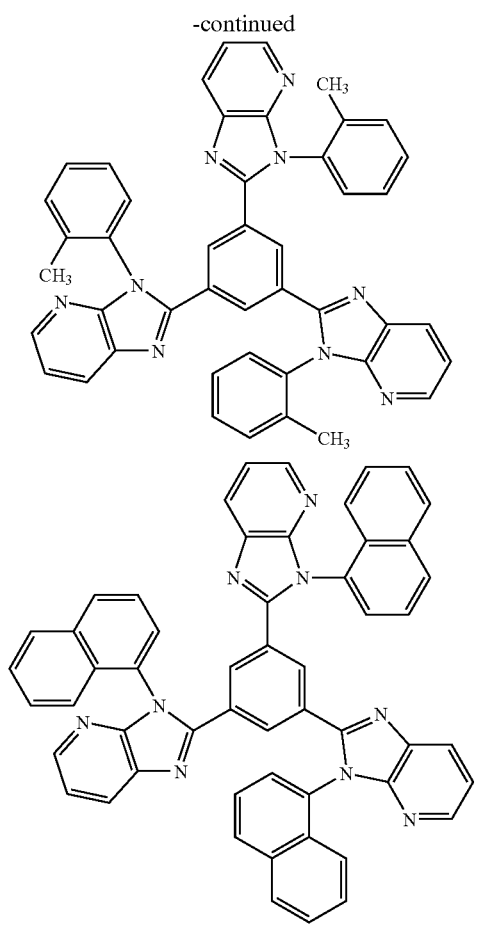

The thickness of the organic polymer layer is preferably 0.02 to 15 μm and more preferably 0.1 to 3 μm. When the thickness is less than 0.02 μm, coating is insufficient due to unevenness of the thickness of the layer and desired electric performance cannot be obtained. On the other hand, when the thickness is more than 15 μm, the after-image (attenuating speed of the signal current after the signal radiation is cut off) is adversely affected, which is not preferred.

The hole blocking material is preferably included in more than 0.01 wt % of the polymer included in the charge transfer layer and more preferably in 1 to 50 wt of the same. When the hole blocking material is less than 0.01 wt %, the function of the hole blocking material becomes insufficient and the after-image is adversely affected. When the hole blocking material is more than 50 wt %, the performance of the polymer as the binder becomes insufficient whereby the film deteriorates in stability and close contact with the photoconductive layer, which is not preferred.

As the polymer included in the charge transfer layer, acrylic resin, polyimide, BCB, PVA, polyethylene, polycarbonate, polyetherimide can be shown, acrylic resin and polycarbonate are more preferred and among them, polycarbonate Z (PCz) is especially preferred.

Though, the solid radiation detecting system of the TFT system has been described here as preferred embodiments of the present invention by way of example, the present invention may be applied to any solid radiation detecting system provided with a recording photoconductive layer.

Embodiment 1

A charge transfer layer of antimony sulfide ($Sb_2S_3$) was formed in thickness of 2 μm on a substrate on which switching TFT's were arranged. A crystallization suppressing layer 0.15 μm thick was formed by depositing Se raw material containing As in 3%. A 1000 μm thick recording photoconductive layer including amorphous Se was subsequently formed by depositing an Se raw material containing Na at 10 ppm.

Then a fullerene-containing organic polymer layer was formed. As the fullerene, fullerene $C_{60}$ ("nanom purple" ($C_{60}$) manufactured by Frontier Carbon Inc.) was employed. 2.5 wt % of poly carbonate resin (PCz) (lupilon PCZ-400 manufactured by "Mitsubishi Gas Chemical Company Inc.") and the fullerene $C_{60}$ which was 30 wt % of the PCz were dissolved in o-dichlorobenzene, whereby a coating solution was prepared. An organic polymer layer 0.2 μm thick was obtained by forming film on the recording photoconductive layer by spin coating the coating solution and evaporating the solvent with a vacuum dryer. Finally, a voltage applying electrode (first electrode) was formed in 0.1 μm by depositing Au.

Embodiment 2

A radiation detecting system was produced in the same manner as the embodiment 1 except that oxidized fullerene $C_{60}$ was employed instead of the fullerene $C_{60}$.

Embodiment 3

A radiation detecting system was produced in the same manner as the embodiment 1 except that the following ETM1 was employed instead of the fullerene $C_{60}$.

ETM1

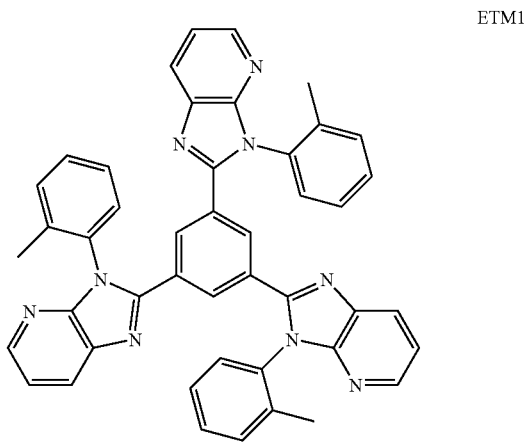

Embodiment 4

A radiation detecting system was produced in the same manner as the embodiment 1 except that the following ETM2 was employed instead of the fullerene $C_{60}$.

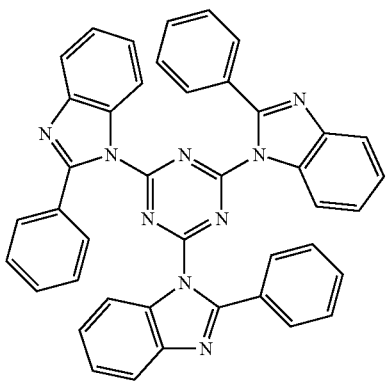

ETM2

Embodiment 5

A radiation detecting system was produced in the same manner as the embodiment 1 except that the charge transfer layer of antimony sulfide ($Sb_2S_3$) was formed in thickness of 0.3 μm on the recording photoconductive layer after the recording photoconductive layer was formed and before the organic polymer layer was formed in the embodiment 1.

Embodiment 6

A radiation detecting system was produced in the same manner as the embodiment 1 except that the charge transfer layer of antimony sulfide ($Sb_2S_3$) was formed in thickness of 0.3 μm on the organic polymer layer after the organic polymer layer was formed and before the electrode was formed in the embodiment 1.

COMPARATIVE EXAMPLE 1

A radiation detecting system was produced in the same manner as the embodiment 1 except that the organic polymer layer was formed by only polycarbonate resin (PCz).

COMPARATIVE EXAMPLE 2

A radiation detecting system was produced in the same manner as the embodiment 1 except that carbon black was employed instead of the fullerene $C_{60}$ included in the organic polymer layer.

(Evaluation)

The dark-current was measured on the basis of the test pattern on the substrate. The measurement was executed with the voltage applying electrode layer applied with a voltage of +10 kV and the carrier collective electrode grounded. After-image was evaluated by projecting 300 mR X-ray pulses at the tube voltage of 80 kV and on the basis of the common logarithm log(IA/IL) of the ratio of the light current IA during projection of the pulses to the leak current IL 15 seconds after termination of the pulses. As this value becomes larger, attenuation of the signals after the X-ray projection is cut is earlier, that is, the afterimage is less. In this evaluation, the value of lag is preferably is not less than 3.0 and more preferably is not less than 3.2.

Result is shown in the following table 1. Crystallization of a-Se was evaluated through a measurement of the samples stored at 40° C. for 300 hours of the microscopic Raman spectrum. It was confirmed on the basis of the phenomenon that the band (256 $cm^{-1}$) reverting to expansion and contraction vibration of Se—Se was shifted to 237 $cm^{-1}$ by crystallization. Specifically, a part of a-Se including the organic-polymer side interface was embedded in epoxy resin to be surrounded thereby, and was cut with a diamond microtome to expose an interface of a-Se. Arbitrary 50 points were extracted horizontally from the area apart from the interface of a-Se by 1 μm in the direction of the depth and measured, and the proportion of the number of the points where a crystallized a-Se peak was detected was calculated. When the number of the points where an a-Se was crystallized is 0, the evaluation is ⊚ (very good), when the number was in the range of 0 to 3, the evaluation is ○ (good), when the number was in the range of 3 to 10, the evaluation is Δ (fair), when the number was not less than 10, the evaluation is × (poor).

TABLE 1

| | hole block | layer between photoconductive layer and the first electrode | concentration wt % | thickness μm | dark current A/cm² | after image | crystallization |
|---|---|---|---|---|---|---|---|
| Embodiment 1 | $C_{60}$/PCz | organic polymer only | 30 | 0.2 | $1.2 \times 10^{-11}$ | 4.0 | ⊚ |
| Embodiment 2 | $C_{60}$(O)/PCz | organic polymer only | 30 | 0.2 | $1.2 \times 10^{-11}$ | 4.3 | ⊚ |
| Embodiment 3 | ETM1/PCz | organic polymer only | 30 | 0.2 | $1.3 \times 10^{-11}$ | 3.6 | ⊚ |
| Embodiment 4 | ETM2/PCz | organic polymer only | 30 | 0.2 | $1.2 \times 10^{-11}$ | 3.5 | ⊚ |
| Embodiment 5 | $C_{60}$/PCz | $Sb_2S_3$/organic polymer | 30 | 0.2 | $1.2 \times 10^{-11}$ | 4.0 | Δ |
| Embodiment 6 | $C_{60}$/PCz | organic polymer/$Sb_2S_3$ | 30 | 0.2 | $1.1 \times 10^{-11}$ | 4.0 | ⊚ |
| Comparative Example 1 | PCz only | organic polymer only | — | 0.2 | $1.2 \times 10^{-11}$ | 2.1 | ⊚ |
| Comparative Example 2 | carbon black/PCz | organic polymer only | 5 | 0.2 | $4.0 \times 10^{-10}$ | 2.6 | ⊚ |

As can be seen from table 1, the radiation detecting systems of the present invention are lower in the dark current and more suppressed in the after image as compared with the comparative example 1 where the organic polymer layer includes polycarbonate (PCz) only and the comparative example 2 where the organic polymer layer includes polycarbonate including therein carbon black. Further, embodiments 1 to 4, where the organic polymer layer is directly adjacent to the photoconductive layer, suppresses the crystallization of the photoconductive layer as compared with the embodiment 5, where the charge transfer layer including antimony sulfide ($Sb_2S_3$) is provided between the organic polymer layer and the photoconductive layer.

Embodiments 7 to 10

A radiation detecting system was produced in the same manner as the embodiment 1 except that the thickness of the organic polymer layer was changed as shown in the following table 2. The result of dark current evaluation and after image evaluation was shown in the following table 2.

TABLE 2

| | hole block | concentration wt % | thickness μm | dark current A/cm$^2$ | after image |
|---|---|---|---|---|---|
| Embodiment 7 | $C_{60}$/PCz | 30 | 0.01 | $1.2 \times 10^{-11}$ | 3.0 |
| Embodiment 8 | $C_{60}$/PCz | 30 | 0.03 | $1.3 \times 10^{-11}$ | 3.5 |
| Embodiment 1 | $C_{60}$/PCz | 30 | 0.2 | $1.2 \times 10^{-11}$ | 4.0 |
| Embodiment 9 | $C_{60}$/PCz | 30 | 10 | $1.2 \times 10^{-11}$ | 3.5 |
| Embodiment 10 | $C_{60}$/PCz | 30 | 20 | $1.2 \times 10^{-11}$ | 2.9 |

As can be seen from table 2, the thickness is substantially optimized at 0.2 μm and is preferred to be 0.02 μm to 15 μm. When it is less than 0.02 μm, the coating performance becomes insufficient due to unevenness in thickness of film, and desired electric characteristics cannot be obtained. As the thickness is increased, the defect due to unevenness in thickness of film is suppressed, while when the thickness is larger than 15 μm, after image deteriorates due to deterioration in the charge transfer performance, which is not preferable.

Embodiments 11 to 15

A radiation detecting system was produced in the same manner as the embodiment 1 except that the fullerene $C_{60}$ contents included in the organic polymer layer was changed as shown in the following table 3. The result of dark current evaluation and after image evaluation was shown in the following table 3. The close contact was evaluated by the use of the sample where only the photoconductive layer (a-Se layer) and the organic polymer layer were formed under the conditions the same as those in the embodiments 11 to 15. The close contact was evaluated by conducting grid tape peeling test according to JIS D0202-1988. Cellophane tape ("CT 24": manufactured by "Nichiban Co., Ltd.") was brought into a close contact with the film with a bulb of a finger and then peeled off the film. Evaluation was represented by the number of grids which were not peeled off. That none of the Au electrode was not peeled off was represented by 20/20 while that the Au electrode was perfectly peeled off was represented by 0/20.

TABLE 3

| | hole block | concentration wt % | thickness μm | Dark current A/cm$^2$ | after image | close contact |
|---|---|---|---|---|---|---|
| Embodiment 11 | $C_{60}$/PCz | 0.001 | 0.2 | $1.2 \times 10^{-11}$ | 3.0 | 20/20 |
| Embodiment 12 | $C_{60}$/PCz | 0.01 | 0.2 | $1.2 \times 10^{-11}$ | 3.2 | 20/20 |
| Embodiment 13 | $C_{60}$/PCz | 1 | 0.2 | $1.2 \times 10^{-11}$ | 3.5 | 20/20 |
| Embodiment 1 | $C_{60}$/PCz | 30 | 0.2 | $1.2 \times 10^{-11}$ | 4.0 | 20/20 |
| Embodiment 14 | $C_{60}$/PCz | 50 | 0.2 | $1.2 \times 10^{-11}$ | 3.2 | 18/20 |
| Embodiment 15 | $C_{60}$/PCz | 75 | 0.2 | $1.3 \times 10^{-11}$ | 2.9 | 12/20 |

As can be seen from table 3, the hole blocking material is included preferably not less than 0.01 wt % of the polymer included in the charge transfer layer and more preferably not less than 1 to 50 wt % of the polymer included in the charge transfer layer. When the hole blocking material is less than 0.01 wt % of the polymer included in the charge transfer layer, it is believed that the hole blocking function becomes insufficient and the after image characteristics deteriorate. Conversely, when the hole blocking material is more than 50 wt % of the polymer included in the charge transfer layer, it is believed that the performance of the polymer as binder becomes insufficient and stability and the close contact against the photoconductive layer deteriorate.

Embodiment 16

A charge-transfer layer including antimony sulfide ($Sb_2S_3$) was formed in thickness of 2 μm on a substrate on which switching TFT's were arranged. Then a crystallization suppressing layer 0.15 μm thick was formed by depositing an Se raw material containing As in 3%. A 1000 μm thick recording photoconductive layer including amorphous Se was subsequently formed by depositing an Se raw material containing Na at 10 ppm. Then a 0.2 μm thick fullerene-containing organic layer containing fullerene $C_{60}$ in 30 wt % of PCz was formed. A $Sb_2S_3$ layer 0.3 μm thick and an Au layer 0.1 μm thick as an upper electrode were subsequently formed. Finally, a cable for applying a high voltage was connected to the upper electrode by Ag paste.

Then, after a resin frame was formed on the periphery of the substrate and a glass plate of the upper lid is bonded to the substrate, a two-pack type epoxy resin was introduced into the space formed by the substrate, resin frame, and the glass plate and was cured for several days, whereby a radiation detecting system was prepared.

Though, a two-pack type epoxy resin was introduced into the space in the embodiment 16, silicone resin, especially adduct type silicone resin may be employed.

What is claimed is:

1. A radiation detecting system for recording the image information by storing electric charges generated in a recording photoconductive layer upon projection of recording electromagnetic waves, comprising:
    a first electrode which is imparted with a positive bias and permeable to recording electromagnetic waves carrying thereon image information,
    the recording photoconductive layer which generates electric charges in response to projection of the recording electromagnetic waves,
    an organic polymer layer disposed between the first electrode and the recording photoconductive layer, said organic polymer layer having a bottom surface, a top surface, and a plurality of side surfaces, wherein the top and bottom surfaces face the first electrode and the recording photoconductive layer, respectively,
    a second electrode which is provided on the side of the recording photoconductive layer opposite to a side where the first electrode is provided, and
    a charge transfer layer disposed between the organic polymer layer and the first electrode, said charge transfer layer covering at least one of the side surfaces of the organic polymer layer,
    wherein the organic polymer layer includes a hole blocking material; and
    wherein the charge transfer layer is a film of a chalcogenide compound and is formed to have a width that is greater than that of the organic polymer layer.

2. A radiation detecting system as defined in claim 1 in which at least one kind of the hole blocking material included in the organic polymer layer is carbon cluster or its derivative.

3. A radiation detecting system as defined in claim 2 in which the carbon cluster is at least one kind selected from a group consisting of fullerene $C_{60}$, fullerene $C_{70}$, fullerene oxide, and their derivatives.

4. A radiation detecting system as defined in claim 1 in which at least one kind of the hole blocking material included in the organic polymer layer is a compound represented by the following general formula (A-1) or (B-1),

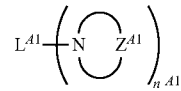

General Formula (A-1)

wherein $L^{A1}$ represents a linkage group, $Z^{A1}$ represents an element group necessary for forming a nitrogen-containing heterocycle and $n^{A1}$ represents an integer not smaller than 2, the compound represented by the general formula (A-1) containing at least 3 nitrogen atoms in an element thereof,

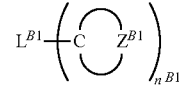

General Formula (B-1)

wherein $L^{B1}$ represents a linkage group, $Z^{B1}$ represents an element group necessary for forming an aromatic hydrocarbon or an aromatic heterocycle and $n^{B1}$ represents an integer not smaller than 2, the compound represented by the general formula (B-1) containing at least 3 nitrogen atoms in an element thereof.

5. A radiation detecting system as defined in claim 1 in which the charge transfer layer comprises antimony sulfide.

6. A radiation detecting system as defined in claim 1, wherein
    the recording photoconductive layer has a bottom surface, a top surface, and a plurality of side surfaces, wherein the top surface and bottom surfaces face the organic layer and the second electrode, respectively,
    wherein the width of the charge transfer layer is greater than each of the width of the top surface of the organic polymer layer and the width of the top surface of the recording photoconductive layer; and
    wherein the charge transfer layer covers at least one of the side surfaces of the organic polymer layer and at least one of the side surfaces of the recording photoconductive layer.

* * * * *